Patented Feb. 22, 1944

2,342,137

UNITED STATES PATENT OFFICE 2,342,137

ANTIOXIDANT

Carlin F. Gibbs, Cuyahoga Falls, Ohio, assignor to The B. F. Goodrich Company, New York, N. Y., a corporation of New York No Drawing. Application December 10, 1942, Serial No. 468,550

4 Claims. (Cl. 260—800)

This invention relates to the preservation of organic materials which tend to deteriorate by absorption of oxygen from the atmosphere and to the means for preventing such deterioration. This application is a continuation-in-part of my copending application Serial No. 405,792 filed August 7, 1941.

The preservation of such materials may be accomplished by introducing into the material to be preserved, as an antioxidant, an arylamino dihydrobenzofurane. Among the materials which may be thus preserved are fatty oils such as linseed oil and tung oil, petroleum oils such as gasoline, fish oils, aldehydes, soaps, turpentine, rubber, and the like. Among the rubbers, vulcanized or unvulcanized, which may be treated in this manner are all the natural rubbers, such as caoutchouc, balata, gutta percha, latex, as well as artificial rubber isomers and certain synthetic rubber-like materials such as copolymers of butadiene-1,3 hydrocarbons with other ethylenic monomers copolymerizable therewith, for example styrene, acrylonitrile, methyl acrylate, methyl methacrylate, and the like. My antioxidants are particularly valuable in preventing flex cracking in vulcanized rubbers.

The arylamino dihydrobenzofuranes which act as antioxidants are of the general formula

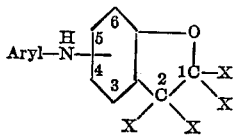

where aryl refers to an aryl nucleus of the benzene, naphthalene, or biphenyl series; X is an alkyl group or hydrogen; and N, H, O, and C represent nitrogen, hydrogen, oxygen, and carbon respectively. The aryl nucleus may contain various substituent groups such as alkyl, aryl, alkoxy, aryloxy, alkenyl, alkenyloxy, halogen, secondary alkyl amino, tertiary alkyl amino, mercapto, alkyl mercapto, and the like.

Among the specific compounds which are embraced in the foregoing formula are the following:

3-phenylamino 1,2-dihydrobenzofurane
4-phenylamino 1,2-dihydrobenzofurane
5-phenylamino 1,2-dihydrobenzofurane
6-phenylamino 1,2-dihydrobenzofurane
3-naphthylamino 1,2-dihydrobenzofurane
3-diphenylamino 1,2-dihydrobenzofurane
4-naphthylamino 1,2-dihydrobenzofurane
5-biphenylamino 1,2-dihydrobenzofurane
3-anisylamino 1,2-dihydrobenzofurane
4-(p-chlorophenyl) amino 1,2-dihydrobenzofurane
5-(p-tolyl) amino 1,2-dihydrobenzofurane
6-(p-cumyl) amino 1,2-dihydrobenzofurane
3-(p-hydroxy phenyl) amino 1,2-dihydrobenzofurane
4-(p-phenetidyl) 1,2-dihydrobenzofurane
4-phenylamino 1,1-dimethyl 1,2-dihydrobenzofurane
4-phenylamino 1,2-dimethyl 1,2-dihydrobenzofurane
4-phenylamino 2,2-dimethyl 1,2-dihydrobenzofurane
4-phenylamino 1-methyl 1,2-dihydrobenzofurane
4-phenylamino 2-methyl 1,2-dihydrobenzofurane
4-phenylamino 1,1-diethyl 1,2-dihydrobenzofurane
4-phenylamino 1,2-dipropyl 1,2-dihydrobenzofurane
4-biphenylamino 1,1-dimethyl 1,2-dihydrobenzofurane
4-beta-naphthylamino 1,1-dimethyl 1,2-dihydrobenzofurane
3-phenylamino 1,1-dimethyl 1,2-dihydrobenzofurane
5-phenylamino 1,1-dimethyl 1,2-dihydrobenzofurane
4-phenylamino 1-methyl 1-hexyl 1,2-dihydrobenzofurane
5-biphenylamino 1-methyl 1-butyl 1,2-dihydrobenzofurane
5-beta-naphthylamino 1-methyl 1-hexyl 1,2-dihydrobenzofurane
Di-4,4'(1,1-dimethyl 1,2-dihydrobenzofurane) amine
Di-4,4'(1-methyl 1,2-dihydrobenzofurane) amine
4-((p-anilino) anilino) 1,1-dimethyl 1,2-dihydrobenzofurane
4-((p-anilino) anilino) 1-methyl 1,2-dihydrobenzofurane
N,N'-di-4,4' (1,1-dimethyl 1,2-dihydrobenzofurane) p-phenylene diamine As a specific example of my invention I shall describe the preparation and use of 4-phenylamino 1,1-dimethyl 1,2-dihydrobenzofurane.

*Example*

The 4-phenylamino 1,1-dimethyl 1,2-dihydrobenzofurane is readily prepared by causing 4-methallyloxy diphenylamine to rearrange to 3-methallyl 4-hydroxy diphenylamine, and then causing the latter compound to cyclize. The rearrangement of 4-methallyloxy diphenylamine may be accomplished by dissolving it in about one-half its weight of diethyl aniline as solvent and heating the solution to about 200° C. for thirty to forty minutes. Dimethyl aniline or various hydrocarbon solvents may also be used. Separation of product from the solvent may be accomplished by fractional distillation at reduced pressure. The product boils at 165° to 175° C. at 3 mm. pressure.

Cyclization of 3-methallyl 4-hydroxy diphenylamine may be accomplished by heating it with about two molecular equivalents of pyridine hydrochloride at about 225° to 250° C. for ten to twenty minutes. The reaction mixture is then washed with water and with 10% caustic alkali solution, and extracted with benzene. The benzene solution is heated to drive off the benzene, leaving 4-phenylamino 1,1-dimethyl 1,2-dihydrobenzofurane, which boils at 145° to 150° C. at 3 mm. pressure and which melts at 64° to 66° C.

Other similar compounds may be prepared by similar treatment of other suitable alkenyloxy diarylamines.

The effectiveness of these compounds as antioxidants is shown by the incorporation of one part by weight of 4-phenylamino 1,1-dimethyl 1,2-dihydrobenzofurane in a composition consisting of 100 parts by weight of rubber, 50 parts of carbon black, 5 parts of zinc oxide, 3 parts of sulfur, 3 parts of pine tar, 3.5 parts of stearic acid, and 1.0 part of mercaptobenzothiazole. Without the antioxidant the tensile strength of this composition drops from about 3900 lb. per sq. in. after vulcanization to less than 1000 lb. per sq. in. after aging a few days in oxygen at 300 lb. per sq. in. and at 70° C. With the antioxidant present the tensile strength of the composition remains well above 2000 lb. per sq. in. after such aging. The resistance of the composition to flex cracking is also greatly increased by the presence of the antioxidant.

Any of the usual pigments, fillers, dyes, reinforcing agents, softeners, vulcanizing agents, accelerators, or other antioxidants, and the like may also be present in the rubber composition. Rubber compositions containing my new antioxidants may be used for a variety of purposes, such as for tire treads or tubes, hose, belting, footwear, molded goods, and the like. Such rubber compositions may be vulcanized in any of the usual ways, such as in steam, hot air, or in a mold. The antioxidant is preferably used in amounts ranging from 0.1 to about 5.0%, although other proportions may be used.

Although I have herein described specific embodiments of my invention, I do not intend to limit myself solely thereto, but to include all the obvious modifications embraced by the spirit and scope of the appended claims.

I claim:

1. A method of retarding the deterioration of an organic substance which tends to deteriorate by absorption of oxygen from the air which comprises incorporating therein an arylamino dihydrobenzofurane in which the arylamino group is a secondary arylamino group attached to the benzene ring of the benzofurane.

2. A method of retarding the deterioration of an organic substance which tends to deteriorate by absorption of oxygen from the air which comprises incorporating therein an arylamino dihydrobenzofurane in which the furane nucleus contains at least one C-alkyl group and in which the arylamino group is a secondary arylamino group attached to the benzene ring of the benzofurane.

3. A method of preserving rubber which comprises incorporating therein a 4-phenylamino 1-alkyl 1,2-dihydrobenzofurane.

4. The vulcanization product of a rubber composition containing an arylamino dihydrobenzofurane in which the arylamino group is a secondary arylamino group attached to the benzene ring of the benzofurane.

CARLIN F. GIBBS.